May 20, 1958 H. VOLLMER 2,835,146
SAW SHARPENING MACHINE
Filed Aug. 25, 1952 8 Sheets-Sheet 1

Fig.1

Inventor:
Heinrich Vollmer
By Gustav H. Evans
Atty.

Fig.2

May 20, 1958  H. VOLLMER  2,835,146
SAW SHARPENING MACHINE
Filed Aug. 25, 1952  8 Sheets-Sheet 3

Fig.3

Inventor:
Heinrich Vollmer
By Gustav Vollmer
Atty.

Fig. 4

May 20, 1958 H. VOLLMER 2,835,146
SAW SHARPENING MACHINE
Filed Aug. 25, 1952 8 Sheets-Sheet 5

Inventor:
Heinrich Vollmer
By Guston H Emery
Atty.

Fig. 8.

May 20, 1958   H. VOLLMER   2,835,146
SAW SHARPENING MACHINE
Filed Aug. 25, 1952   8 Sheets-Sheet 8

Fig. 9

Inventor:
Heinrich Vollmer
By Gustav H. Emery
Atty.

United States Patent Office 2,835,146
Patented May 20, 1958

2,835,146
SAW SHARPENING MACHINE
Heinrich Vollmer, Biberach (Riss), Germany
Application August 25, 1952, Serial No. 306,218
4 Claims. (Cl. 76—41)

The known saw sharpening machines have a mechanical drive by which only a part of the sharpening work is carried out. The constant attendance and work of a workman is required because the operations mentioned below must be manually carried out; the insertion of the grinding disc in the first saw notch of the saw to be sharpened, the removal of the grinding disc and of the advancing pawl upon reaching the last notch of the saw blade, the adjustment of the grinding disc and the retraction of the clamping carriage carrying the saw to its starting position. Only the advance of the saw blade in steps or by teeth and the up and down motion of the grinding disc corresponding to the shape of the tooth takes place automatically, also the alternating swing of the grinding disc when the grinding is to be at a slant. The grinding for a single time or sharpening of the saw teeth is called a grinding or operating passage. Since according to the wear of the saw to be sharpened several working passages are required, the above mentioned manual operations must be carried out for every passage to which belongs the shutting-off of the machine after finishing the work.

The invention is based on the problem of obtaining a complete, automatic operation of the saw sharpening machine so that the above mentioned manual operations are done away with.

The solution of the problem according to the invention is found in a mechanical-hydraulic drive of such a kind that after each mechanical working passage and grinding passage of the saw clamping carriage the lifting of the grinding disc and of the advancng pawl, the setting of the grinding disc, the retraction of the clamping carriage and the reinsertion of the grinding disc and operation of the advancing pawl are carried out hydraulically. After clamping the saw blade in the carriage as hitherto done and the starting of the drive, the entire grinding work is carried out automatically regardless of how many working passages are required. As regards the several characteristics of the hydraulic control it is mentioned that with the hydraulic control a mechanical control cooperates by which the various required working passages can be adjusted. This mechanical control at the end of the entire sharpening work takes care of the automatic stopping of the machine. According to a further feature of the invention, the mechanical control device is so constructed that a certain number of working passages without grinding disc adjustment can be joined to the adjusted number of working passages with grinding disc adjustment, which has the advantage that a finishing operation or equalizing of the ground saw teeth still takes place.

According to the invention, moreover, care is taken that in the case of grinding at a slant the reinsertion of the grinding disc at the beginning of a new working passage always occurs in the proper swing position.

In the drawing, an example of execution of the saw sharpening machine and its control is illustrated in which:

In Figs. 3 to 9, the mechanical and hydraulic control means are shown in their various operating positions, the flow of the oil being shown by conduits or spaces respectively appearing completely filled.

Figure 1:
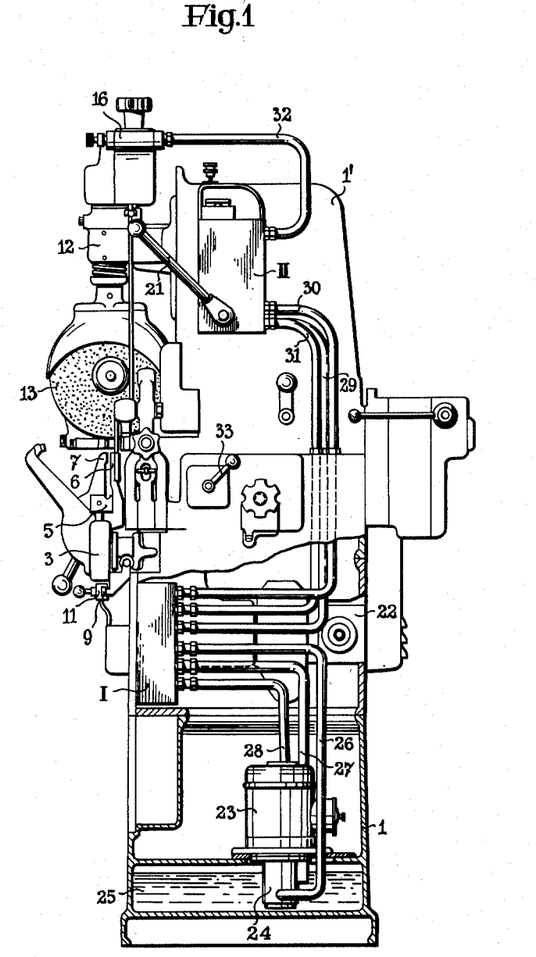
Fig. 1 is a side view of the machine.

The sharpening machine is first described below by its mechanical structure according to Figs. 1 and 2. On a guide 2 connected with the lower portion of the machine standard 1 the clamping carriage for the saw 4 illustrated in Fig. 2 in dotted lines is slidably arranged. The carriage 3 carries the supports 5 on which the saw blade 4 rests with its back. The carriage also carries the rear and front clamping jaws 6, 7 between which the saw blade is firmly clamped, and also the setting rail 8 for the mechanical advance of the carriage. On a bar 9 fixed to the carriage 3, the two end stop lugs 10, 11 are adjustably mounted and fixed thereon. In a guide at the upper portion of the machine standard is slidably mounted for up and down motion the grinding disc carrier 12, which at its lower end carries the grinding disc 13 driven by a wedge-shaped belt 14 from an electromotor 15 which is suspended from the grinding disc carrier 12 and fixed thereto. The grinding disc carrier 12 has on its top a setting device 16 for the grinding disc which may be actuated manually or hydraulically. To the grinding disc carrier is pivotally connected by a rod 17, the advancing pawl 18 coacting with the setting rail 8. The advancing pawl 18 is pivoted to a swing lever 19 moved to and fro by a mechanical drive and fulcrumed upon a bolt 20. The grinding disc carrier may be manually raised and lowered by a hand lever 21 in order to enable the operator to lift the grinding disc and then simultaneously the setting pawl 18 into and from the teeth of saw blade 4.

The mechanical control is carried out by the electric motor 22 built into the machine standard which takes care of the motion of the actuating pawl 18, of the motion of the grinding disc corresponding to the tooth-shaped (tooth-back and tooth breast) and in the case of grinding at a slant of the swing of the grinding disc required after each work on a tooth and about the vertical axis of the grinding disc carrier 12.

A third electromotor 23 built into the machine standard 1 drives an oil pump 24 which is immersed in an oil sump 25 arranged in the bottom part of the machine standard 1.

To the machine standard 1, 1' are connected two hydraulic control blocks I and II. From pump 24 an oil conduit 26 leads to the control block I, from which two oil conduits 27, 28 lead back to the oil sump. Conduits 29 and 30 lead to the control block II while conduit 31 is a return conduit to control block I. Conduit 32 is an extension of the conduit 30 and leads to the grinding disc delivery 16.

By a switch lever 33 mounted on the machine standard all three driving motors 15, 22 and 23 can be started simultaneously. Within the control block I a control valve is rotatably mounted on the axle of which a control lever 34, illustrated in Fig. 2, and coacting with the lugs 10, 11, is fastened. On a second axle 35 journalled in the control block I an adjusting wheel 36 is fastened on the outside thereof.

The additional parts of the combined mechanical-hydraulic control become obvious from the following description of a complete operation, the same starting on the assumption that the saw blade 4 is clamped in the carriage and the carriage in a front view of the machine being in a position completely displaced to the right so that the grinding disc engages in the first notch.

Figure 2:
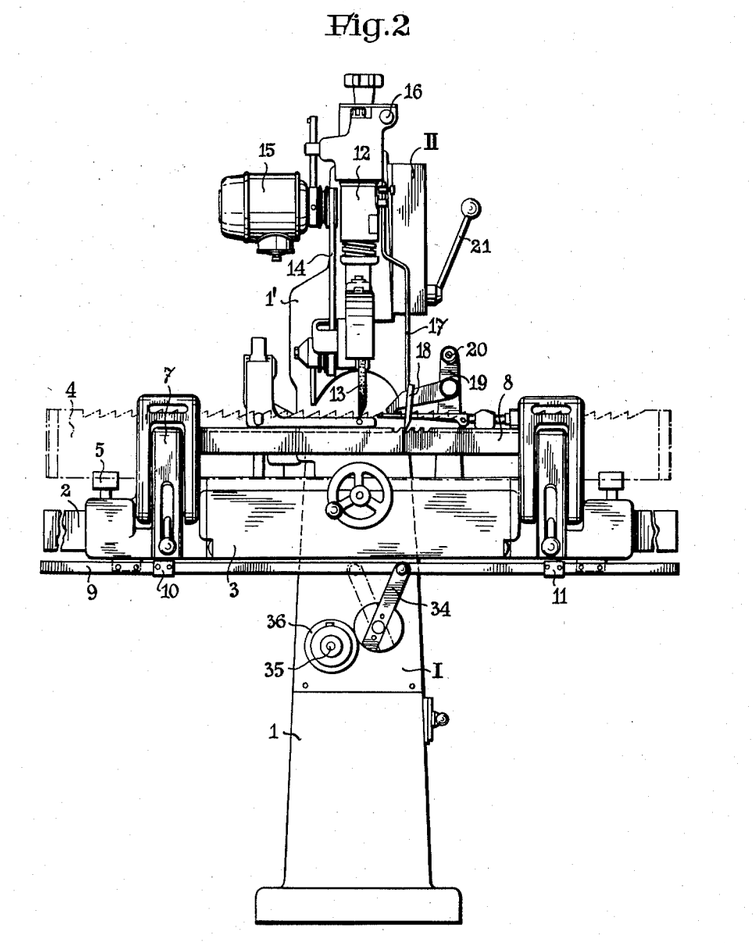
Fig. 2 is a front view of the machine.

In this position the control lever 34 occupies the full-line position of Fig. 2 and stop lug 10 is so adjusted that it abuts control lever 34. The second stop lug 11 is adjusted according to the last tooth of saw blade 4.

Figure 3:
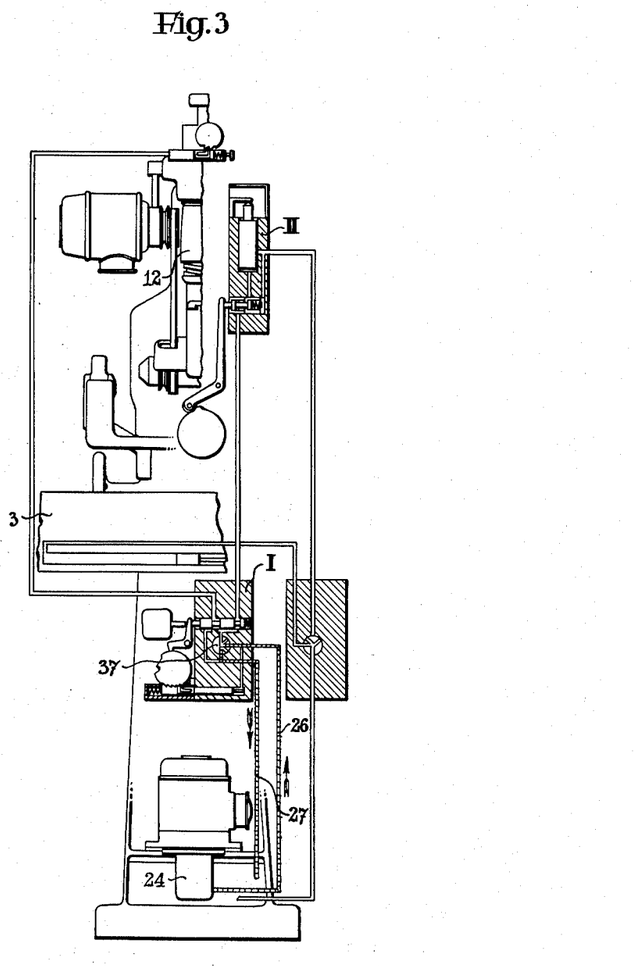

When the drive motors are started by the switch member 33 and after the grinding disc and with it the setting pawl 18 are inserted by the motion of the hand lever 21 into the front notch of the saw blade 4 or setting rail 8 respectively, then the working operation known per se begins. During the step-like motion of the clamping carriage 3 (in Fig. 2 toward the left) one tooth after the other is ground on the tooth back and tooth breast. The single grinding of all teeth on the saw is designated as a passage, and during this first passage the oil pump 24 operates in an idling manner according to Fig. 3. The pressure oil flows through conduit 28 to the control valve 57 rotatably mounted in control block I and fixedly connected to the above mentioned control lever 34. Through the radial bores in control valve 37 the oil flows back through return conduit 27 into the sump as illustrated by the conduits shown as solid in Fig. 3. At the end of the passage the stop lug 11 encounters the control lever 34 which is thereby moving into its position indicated by dotted lines in Fig. 2, whereby the control valve is rotated into its position as apparent from Fig. 4.

Figure 4:
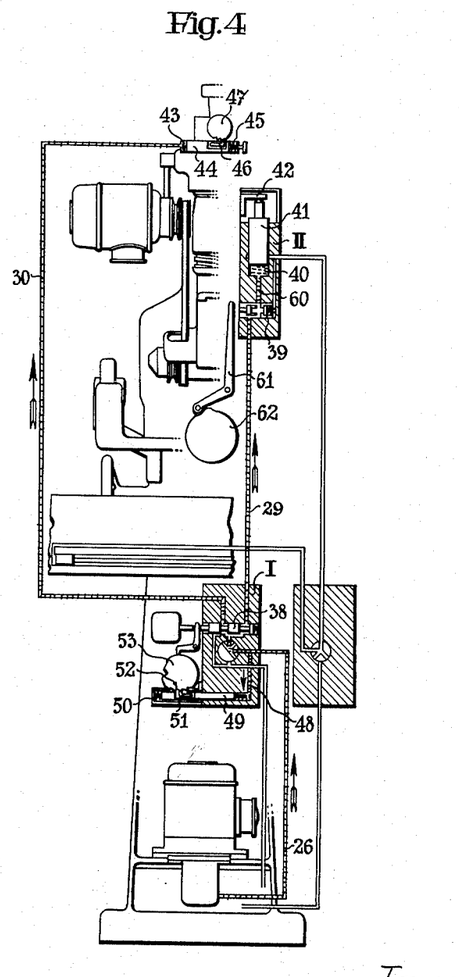

As appears from Fig. 4, the pressure oil through a control piston 38 and in conduit 29 to a control piston 39 built into control block II, presses it to the right and through the channel 60 into the cylinder 40 of stroke and lifting piston 41. Piston 41 cooperates with a stop lug 42 on the grinding disc carrier 12 so that by the upwardly moving piston 41 the carrier 12 is lifted which causes the raising of the grinding disc out of the saw blade and the raising of the setting pawl from the setting rails. At the same time, the pressure oil flows through conduit 30 to the grinding disc delivering device 16. Conduits 30, 32 shown in Fig. 1 as separate elements for simplicity's sake, are illustrated in Fig. 4 as a single conduit 30. The oil flowing through conduit 30 presses the piston 44, slidable in cylinder 43 (Fig. 4) to the right, while the piston compresses the pressure coil spring 45 mounted in cylinder 43. Piston 44 carries a pawl 46 which engages the delivery gear 47 of the grinding disc delivery device. The delivery gear 47 is rotated by one tooth which results in the delivery of the grinding disc by a short distance.

From the pressure oil conduit 26 the oil enters simultaneously into the conduit 49 located in control block I and engages a piston 48 positioned in the control block I which piston is under the influence of a pressure coil spring 50 in its cylinder. This spring 50 is so dimensioned that a displacement of the piston 49 occurs only after the pressure in conduits 26, 29, 30 has risen to a certain value. During the displacement of piston 49 in Fig. 4 toward the left by a pawl 51 connected therewith, a stepping gear 52 is turned by one tooth, as seen in Fig. 4 on a larger scale. The stepping gear 52 is fixed like the control cam disc on an axle 35 of the adjusting hand wheel 36 (Fig. 2). The more detailed description of this mechanism will follow.

Figure 6:
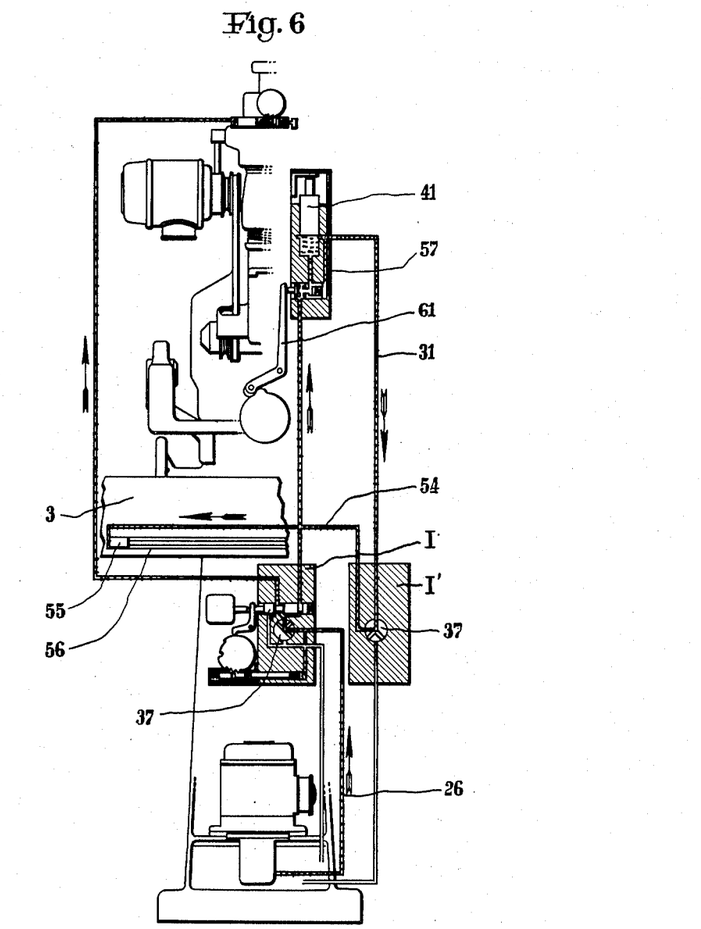
Figure 7:
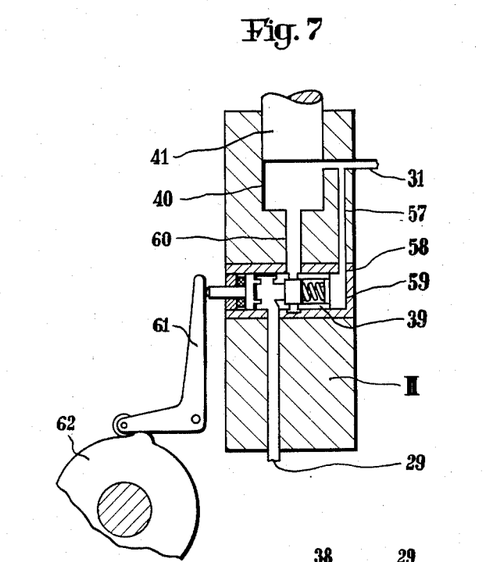

When the lifting piston 41 has reached its highest position as illustrated in Fig. 6, then it has opened access to conduit 31 and the pressure oil flows on to another point of the control valve 37 provided with transverse bores and which is illustrated in the diagrammatic showing at I' alongside control I. In the practical embodiment, of course, the two diagrammatically represented positions of control blocks I, I' coincide. From control valve 37 the oil flows on through the conduit 54 into the cylinder 55 in which a piston 56 connected with the clamping carriage, is arranged. As a result the clamping carriage 3 in Figs. 2 and 6 moves toward the right, thus returns to its starting position. In control block II the pressure oil flows from the conduit 31 into the conduit 57 located in control block II whereby the piston slide 39 is displaced toward the left, Fig. 7. In this position ordinarily the flow of the pressure oil from conduit 29 into cylinder 40 would be interrupted. In order to maintain this flow, for the carriage in the moment of the mentioned displacement of the control piston 39 could not have reached its terminal position, in the control piston 39 a smaller additional piston 58 is mounted which is constantly under the influence of a pressure coil spring 59 positioned in piston 39 (Fig. 7). Due to the oil pressure the small piston 58 is pushed back so that the pressure oil can flow into conduit 60 leading to cylinder 40.

Figure 8:
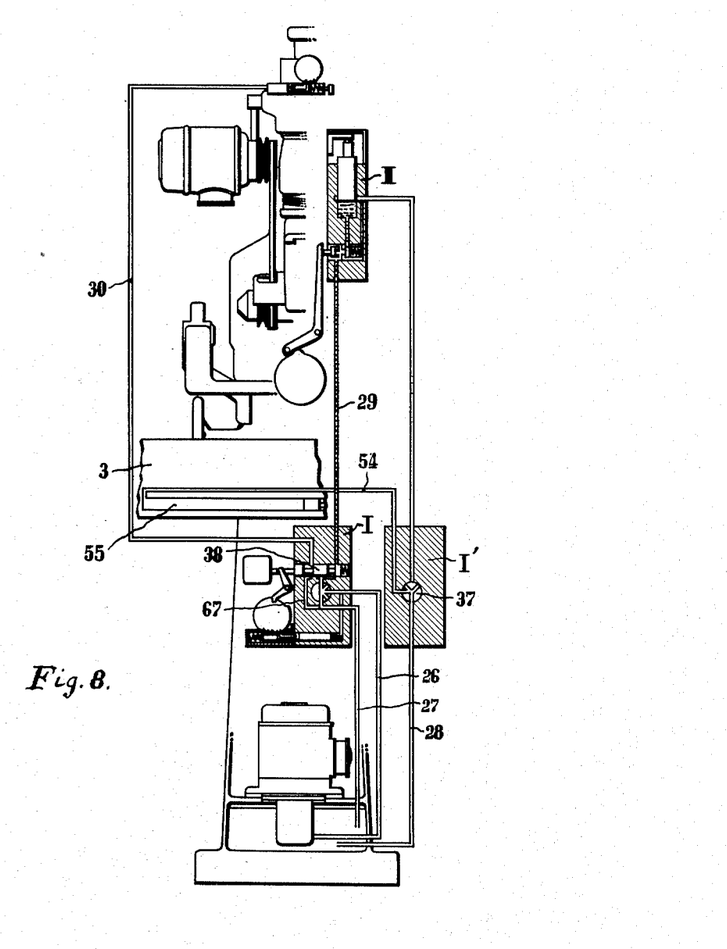

At the end of the carriage displacement toward the right the lug 10 engages the control lever 34 which is thereby swung into its full-line position of Fig. 2, and the control valve 37 occupies the position apparent from Fig. 8, in which the carriage cylinder conduit 54 is connected with the return conduit 28, so that on the now resulting displacement of carriage 3 the oil can flow back from cylinder 55 into the sump. Conduit 29 loses its pressure because the pressure conduit 26 leading from the pump is now connected with the return conduit 27, the pump operating idly according to Fig. 3. Owing to the lack of pressure in control block II, the pressure coil spring 59 presses the small piston back again so that the oil in cylinder 40 of the lifting piston cannot flow back and the grinding disc remains in lifted position. The oil in conduit 30 can flow off through control piston 38 and channel 67 into the return conduit 27.

As soon as the boss of the mechanically driven disc 62 moves the bell crank 61 fulcrumed on the machine standard, the piston slide 39 is pushed toward the right so that now the oil can flow through conduits 60, 29, 27 into the sump. As a result the grinding disc carrier moves downwardly and the grinding disc 13 engages again the first notch of the saw blade. Also, the setting pawl is again engaged and now the second passage of the saw blade commences at the end of which the described cycle of operations is repeated until the number of passages corresponding to the adjustment of the hand wheel is completed.

Figure 5:
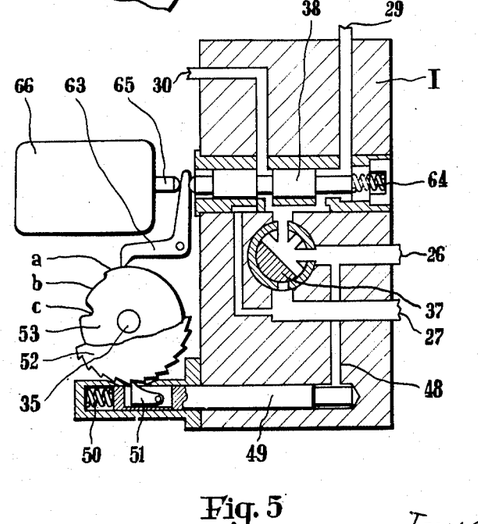
Figs. 5 to 7 illustrate on a larger scale sections through several control devices.
Figure 9:
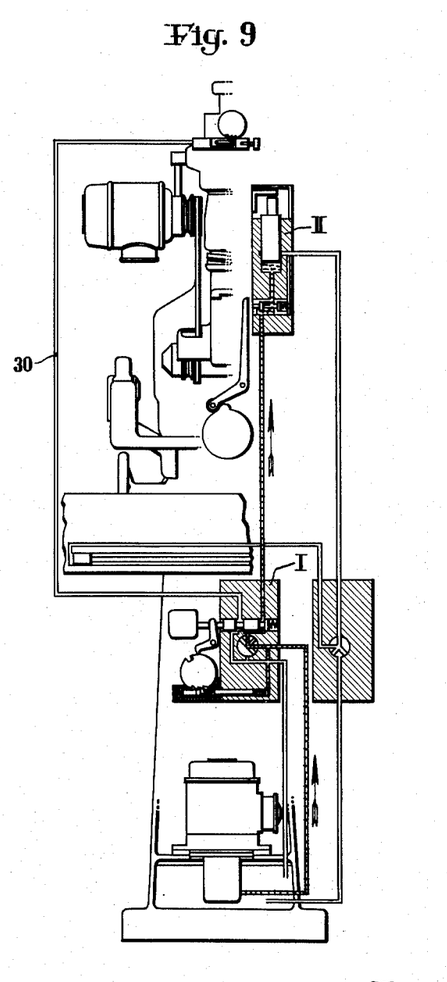

During the adjusted number of grinding strokes, the bell crank 63 apparent from Fig. 5, reacts on the cylindrical periphery of curved disc 53. This reaction is due to a pressure coil spring 64 acting on the piston slide 38 which presses the end of the piston against the free end of lever 63 which, on the other hand, abuts the pin 65 of an interrupter control 66. In the drawn example (Fig. 5) the control surface *a* is joined by a small cylindrical control surface *b* which is set backward with respect to surface *a*. Adjacent control surface *b* the disc 53 has a surface portion *c* still more set back. When bell crank 63 during the step-like rotation of disc 62 by setting lever 49 at the end of the last grinding stroke passes to control surface *b*, owing to the influence of spring 64, a small displacement of piston slide 38 results so that as illustrated in Fig. 9, the pressure oil from conduit 26 cannot flow into conduit 30, that thus from this moment a further delivery of the grinding disc does not ensue. Otherwise, the described cycle of operation according to the length of curve *b* is repeated, e. g. three times.

At the end of the last equalizing stroke the bell crank 63 slides on the surface *c* of the control disc 53 as illustrated in Fig. 8. Spring 64 in control block I displaces piston slide 38 further to the left whereby access to conduit 29 is closed and simultaneously all three driving motors are stopped at the same time. The machine stands still, the grinding disc carrier remaining in lifted inoperative position.

If the control surface *a* merges directly into surface *c*, then the machine is automatically stopped after the last grinding passage with delivery.

The mechanical control is constructed for grinding at a slant so that the saw teeth are alternately ground at a right-hand and left-hand bevel. By the rotating main shaft which causes the advance of the saw and the motion of the grinding disc corresponding to the tooth shape, a control shaft is driven at half speed, the right-hand and left-hand curve of which constantly causes, through a control lever, the swinging of the grinding disc for the right-hand and left-hand bevel grinds. When the control shaft is connected the cam disc 62 constantly rotates, and in the illustrated example (Fig. 7), through bell crank 61, causes the displacement of the piston slide 39 in control block II toward the right. When the lifting piston 41 is in its highest position as represented in Fig. 7, the piston slide 38 is always again moved to the left by the pressure oil flowing through conduit 57. Thus, there is a constant to and fro motion of the piston slide 39. As already described above, by the arrangement of the spring-loaded small piston 58 in piston slide 39, care is taken that the pressure oil from conduit 29 can flow through in each position of the piston slide. The cam disc 62 is connected with the mentioned control shaft of the mechanical control in such a way that the displacement of the piston slide 39 in Fig. 7 to the right always occurs in the same swing position of the grinding disc determined by the control shaft, for example, in the position for right-hand grind. In this manner, care is taken that the re-insertion of the grinding disc in the first notch at the beginning of a new working passage occurs always in the same grinding disc swinging position, for example, for right-hand grind. The swinging of the grinding disc carrier also in lifted position of the grinding disc occurs constantly during the entire working operation.

I claim as my invention:

1. A saw sharpening machine comprising a machine standard, a saw clamping carriage slidably mounted on the standard, a grinding disc and carrier mounted on the standard above the carriage, a pawl and setting rail co-operating with the pawl, said pawl being operatively connected with the carrier for the grinding disc, means to move the grinding disc away from and toward the carriage, a hydraulic system for operating the vertical movement of the grinding disc and the carriage controlled by the pawl and rail, and a mechanical control device for the hydraulic system mounted in the standard and comprising a control cam disc, corresponding to the required working conditions, a lever in contact with the cam disc, a spring-loaded control piston bearing against the lever, and means to intermittently rotate the cam disc.

2. A saw sharpening machine comprising a machine standard, a saw clamping carriage slidably mounted on the standard, a grinding disc and carrier mounted on the standard above the carriage, a pawl and setting rail co-operating with the pawl, said pawl being operatively connected with the carrier for the grinding disc, means to move the grinding disc away from and toward the carriage, a hydraulic system for operating the vertical movement of the grinding disc and the carriage controlled by the pawl and rail, and a mechanical control device for the hydraulic system mounted in the standard and comprising a control cam disc, a lever in contact with the cam disc, a spring-loaded control piston bearing against the lever, the cam disc corresponding to the required working conditions, and means to intermittently rotate the cam disc, and the control cam disc having control surfaces to operate the vertical movement of the grinding disc toward and away from the saw clamping carriage.

3. A saw sharpening machine comprising a machine standard, a saw clamping carriage slidably mounted on the standard, a grinding disc and carrier mounted on the standard above the carriage, a pawl and setting rail co-operating with the pawl, said pawl being operatively connected with the carrier for the grinding disc, means to move the grinding disc away from and toward the carriage, a hydraulic system for operating the vertical movement of the grinding disc and the carriage controlled by the pawl and rail, and a mechanical control device for the hydraulic system mounted in the standard and comprising a control cam disc, a lever in contact with the cam disc, and a spring-loaded control piston bearing against the lever, the cam disc corresponding to the required working conditions, means to intermittently rotate the cam disc, and a control piston in the hydraulic system whereby the rotation of the control cam disc by steps is carried out by the control system.

4. A saw sharpening machine comprising a machine standard, a saw clamping carriage slidably mounted on the standard, a grinding disc and carrier mounted on the standard above the carriage, a pawl and setting rail co-operating with the pawl, said pawl being operatively connected with the carrier for the grinding disc, means to move the grinding disc away from and toward the carriage, a hydraulic system for operating the vertical movement of the grinding disc and the carriage controlled by the pawl and rail, and a mechanical control device for the hydraulic system mounted in the standard and comprising a control cam disc, a lever in contact with the cam disc, and a spring-loaded control piston bearing against the lever, the cam disc corresponding to the required working conditions, means to intermittently rotate the cam disc, and the control cam disc having control surfaces to operate the vertical movement of the grinding disc toward and away from the saw clamping carriage, and a hand wheel connected to the control cam disc for selective adjustment of the number of movements of the grinding discs.

References Cited in the file of this patent

UNITED STATES PATENTS

| 1,264,528 | Keil | Apr. 30, 1918 |
| 1,846,331 | Hickey | Feb. 23, 1932 |
| 2,113,287 | Baldenhofer | Apr. 5, 1938 |
| 2,519,748 | Duquette | Aug. 22, 1950 |
| 2,607,243 | McEwan | Aug. 19, 1952 |
| 2,625,842 | McEwan | Jan. 20, 1953 |
| 2,675,717 | Standal | Apr. 20, 1954 |

FOREIGN PATENTS

| 278,669 | Switzerland | Feb. 1, 1952 |